(12) United States Patent
Sasaki

(10) Patent No.: US 10,288,454 B2
(45) Date of Patent: May 14, 2019

(54) ENCODER INCLUDING AN ORIGIN POSITION DETECTION FUNCTION

(71) Applicant: CANON PRECISION INC., Hirosaki-shi (JP)

(72) Inventor: Ryo Sasaki, Hirosaki (JP)

(73) Assignee: CANON PRECISION INC., Aomori-Ken (JP)

( * ) Notice: Subject to any disclaimer, the term of this patent is extended or adjusted under 35 U.S.C. 154(b) by 158 days.

(21) Appl. No.: 15/359,430

(22) Filed: Nov. 22, 2016

(65) Prior Publication Data

US 2017/0153129 A1  Jun. 1, 2017

(30) Foreign Application Priority Data

Nov. 26, 2015 (JP) .................................. 2015-230865

(51) Int. Cl.
  *G01D 5/34* (2006.01)
  *G01D 5/38* (2006.01)
  *G01D 5/347* (2006.01)

(52) U.S. Cl.
  CPC ......... *G01D 5/34715* (2013.01); *G01D 5/347* (2013.01); *G01D 5/3473* (2013.01); *G01D 5/34707* (2013.01); *G01D 5/34746* (2013.01); *G01D 5/38* (2013.01)

(58) Field of Classification Search
  CPC ........... G01D 5/34715; G01D 5/34746; G01D 5/3473
  USPC ......................................... 250/231.1–231.18
  See application file for complete search history.

(56) References Cited

U.S. PATENT DOCUMENTS

| 8,395,535 | B2* | 3/2013 | Kawada | G01D 5/2457 250/231.13 |
| 10,024,695 | B2* | 7/2018 | Kato | G01D 5/34715 |
| 2008/0315135 | A1 | 12/2008 | Okada | |
| 2009/0321621 | A1* | 12/2009 | Yoshida | G01D 5/3473 250/231.13 |

(Continued)

FOREIGN PATENT DOCUMENTS

| DE | 102015006745 A1 | 12/2015 |
| EP | 2386832 A2 | 11/2011 |
| JP | 5639421 A | 10/2014 |

OTHER PUBLICATIONS

Extended European Search Report; for Application No. EP 16199735. 8; dated Apr. 13, 2017; pp. 1-9.

*Primary Examiner* — Seung C Sohn
(74) *Attorney, Agent, or Firm* — Canon U.S.A., Inc. IP Division

(57) ABSTRACT

An encoder includes a scale having a continuous part where physical characteristics varies and a discontinuous part that interrupts the continuous part, a detector that be relatively displaced with respect to the scale and that detects the physical characteristics of the scale, and a processor that detects an origin of the scale on the basis of a signal for displacement detection output from the detector. The detector includes a sensitive part having sensitivity contributing to the signal for displacement detection and an insensitive part having no sensitivity contributing to the signal for displacement detection. The processor detects the origin on the basis of signal intensity of each of signals for displacement detection that the detector outputs when the sensitive and insensitive parts detect physical characteristics of the discontinuous part.

16 Claims, 15 Drawing Sheets

(56) References Cited

U.S. PATENT DOCUMENTS

2010/0072348 A1    3/2010  Takahashi
2012/0085896 A1*  4/2012  Koiso ................ G01D 5/34715
                                                                   250/231.1

* cited by examiner

ENCODER INCLUDING AN ORIGIN POSITION DETECTION FUNCTION

BACKGROUND OF THE INVENTION

Field of the Invention

The present invention relates to an encoder including with an origin position detection function.

Description of the Related Art

An encoder has been recently used to detect a position and a velocity. As one example of the encoder, an incremental encoder has been known. The incremental encoder detects a position using a counter on the basis of relative displacement between a scale and a sensor, but, immediately after power on, fails to detect the position due to reset of the counter. Accordingly, the sensor and the scale are displaced relatively to detect an origin position immediately after power on, and the counter is reset when the origin position is detected using an origin signal. This is referred to as origin detection. After the origin detection, position detection from the origin position can be performed. In Japanese Patent No. 5639421, an origin position is detected when amplitude of a signal for displacement detection is smaller than a threshold value on the basis of a discontinuous part provided on a part of a pattern of a scale for displacement detection.

However, in Japanese Patent No. 5639421, when amplitude of the signal for displacement detection decreases in a whole system, a position where the amplitude is smaller than the threshold vale changes and as a result, the origin position may be wrongly detected.

SUMMARY OF THE INVENTION

In the view of the problem, the present invention can provide an encoder capable of easily guaranteeing synchronization between an origin signal and a signal for displacement detection, and capable of precisely detecting an origin position.

An encoder as one aspect of the invention includes a scale including a continuous part where physical characteristics periodically varies and a discontinuous part that interrupts the continuous part, a detector that be relatively displaced with respect to the scale and that detects the physical characteristics of the scale, and a processor that detects an origin of the scale on the basis of a signal for displacement detection output from the detector. The detector includes a sensitive part that having sensitivity contributing to the signal for displacement detection output from the detector on the basis of the physical characteristics and an insensitive part having no sensitivity contributing to the signal for displacement detection output from the detector on the basis of the physical characteristics. The processor detects the origin on the basis of signal intensity of the signal for displacement detection that the detector outputs when the sensitive part detects physical characteristics of the discontinuous part and on the basis of signal intensity of the signal for displacement detection that the detector outputs when the insensitive part detects the physical characteristics of the discontinuous part.

Further features of the present invention will become apparent from the following description of exemplary embodiments with reference to the attached drawings.

DESCRIPTION OF THE PREFERRED EMBODIMENTS

Figure 1:
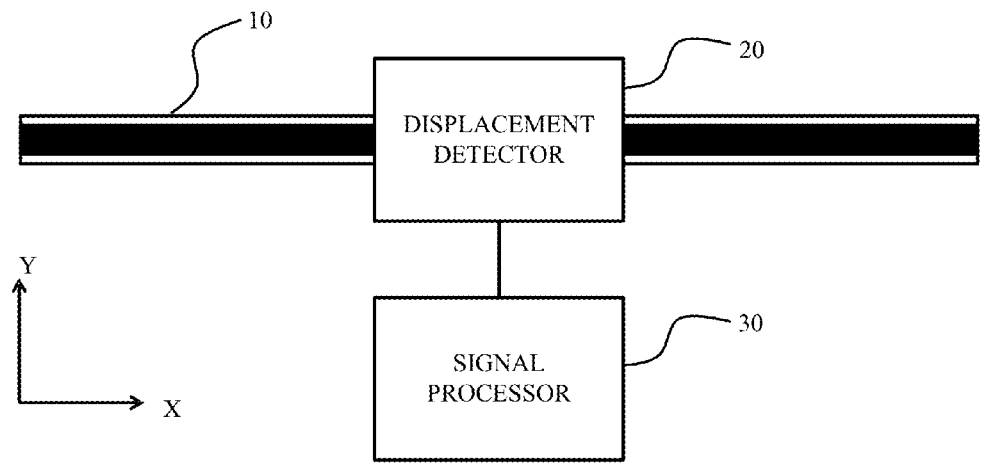
FIG. 1 is a block diagram of an encoder (first and second examples).

Exemplary embodiments of the present invention will be described below with reference to the accompanied drawings. In each of the drawings, the same elements will be denoted by the same reference numerals and the duplicate descriptions thereof will be omitted.

First Example

FIG. 1 is a block diagram of an encoder according to this example. The encoder includes a scale 10, displacement detector 20 and a signal processor 30. The encoder is a reflective optical incremental encoder that detects displacement of an object by detecting relative displacement between the scale 10 and the displacement detector 20. The scale is a linear scale mounted along a displacement direction of the object. The displacement detector 20 is mounted to a fixing member and outputs a signal for displacement detection. The signal processor 30 detects an origin position of the scale 10 on the basis of variation of the signal for displacement detection output from the displacement detector 20, which is positioned on the origin position. In this example, a length in a detection direction of the scale 10 is 99.84 mm.

Figure 2:
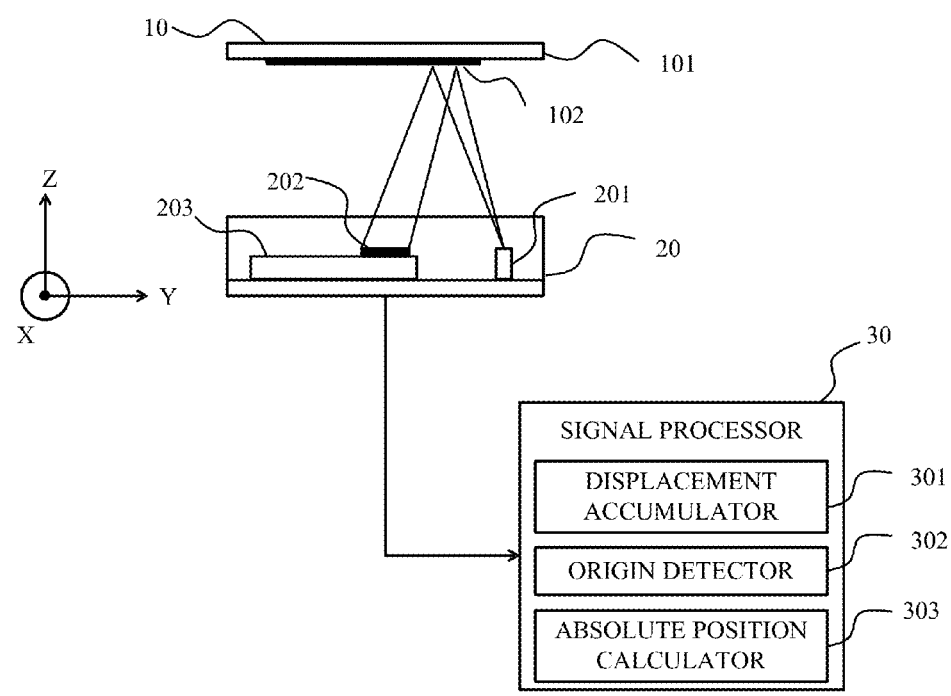
FIG. 2 is a schematic diagram of the encoder viewed from a detection axis direction (the first example).

FIG. 2 is a schematic diagram of the encoder viewed from a detection axis direction (an X-axis direction). The scale 10 includes a base material 101 that is composed of glass, and a reflective film 102 that is a chromium film patterned on the glass base material. The scale 10 reflects light emitted from the displacement detector 20, and the reflected light is incident on the displacement detector 20 again. The base material 101 may be composed of a resin such as a polycarbonate instead of glass. Additionally, the reflective film 102 is not limited to the chromium film, and may be a combination of an aluminum film and a protective film to protect the aluminum film. Moreover, the reflective film 102 is patterned on a front side of the base material 101, but may be patterned on a back side of the base member 101 if the base member 101 is transparent material capable of transmitting light. That is, if having the configuration that allows light emitted from the displacement detector 20 to be incident on the displacement detector 20 again, the present invention is not limited to the configuration of this example.

The displacement detector 20 includes a light source 201 that emits light to the scale 10, a light receiver 202 that receives the light reflected by the scale 10, and a light receiving element 203 that converts the light received by the light receiver 202 into an electrical signal. That is, the displacement detector 20 emits the light to the scale 10, receives the light reflected by the scale 10, and converts the received light into the electrical signal. In this example, a light emitting diode (LED) is used as the light source 201. In addition, in this example, a divergent luminous flux configuration that a parallel luminous flux lens collimating a luminous flux between the scale 10 and the light source 201 is not arranged is used. In the divergent luminous flux configuration, light from a light source advances while spreading with uniformity without being collimated and focusing on one point. The distance between the light source 201 and the scale 10 is equal to the distance between the light receiver 202 and the scale 10. Accordingly, a reflected image formed by the scale 10 doubles in X-axis and Y-axis directions on the light receiver 202. In this example, the reflective configuration that the displacement detector 20 receives the reflected light from the scale 10 is used, but a configuration that the displacement detector 20 received light transmitted through the scale 10 may be used. Furthermore, in this example, the origin position is detected by detecting the light, but may be detected by detecting magnetism and electricity.

The signal processor 30 includes a displacement accumulator 301 that accumulates displacement, an origin detector 302 that detects an origin, and an absolute position calculator 303 that calculates an absolute position.

Figure 3A:
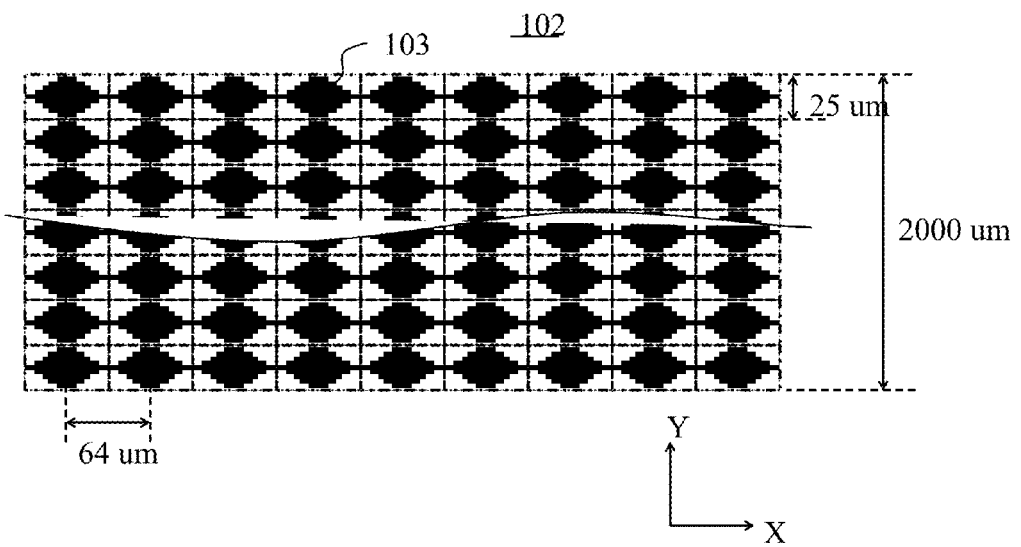
FIGS. 3A and 3B are top views of a reflective film.
Figure 3B:
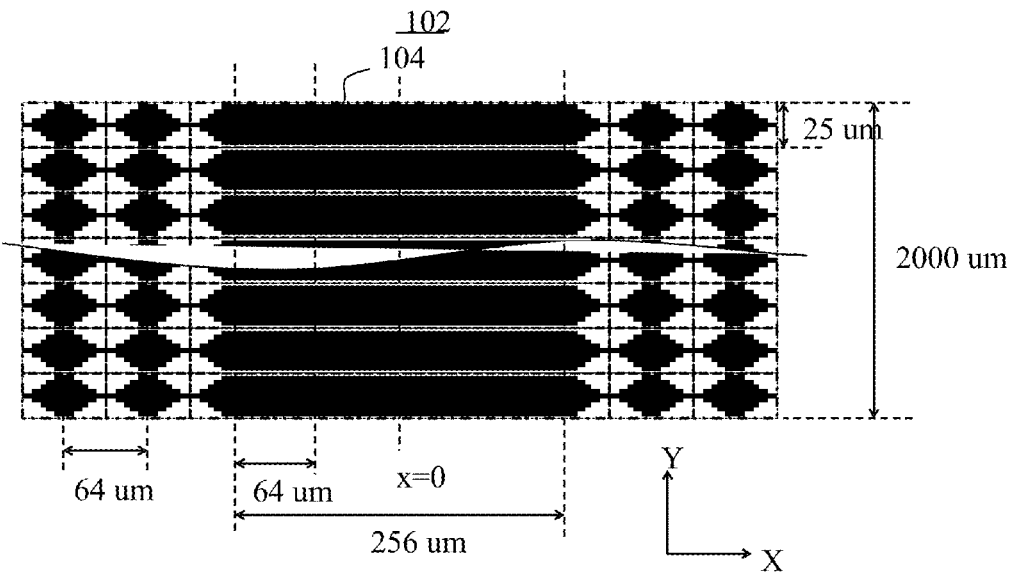
Figure 4:
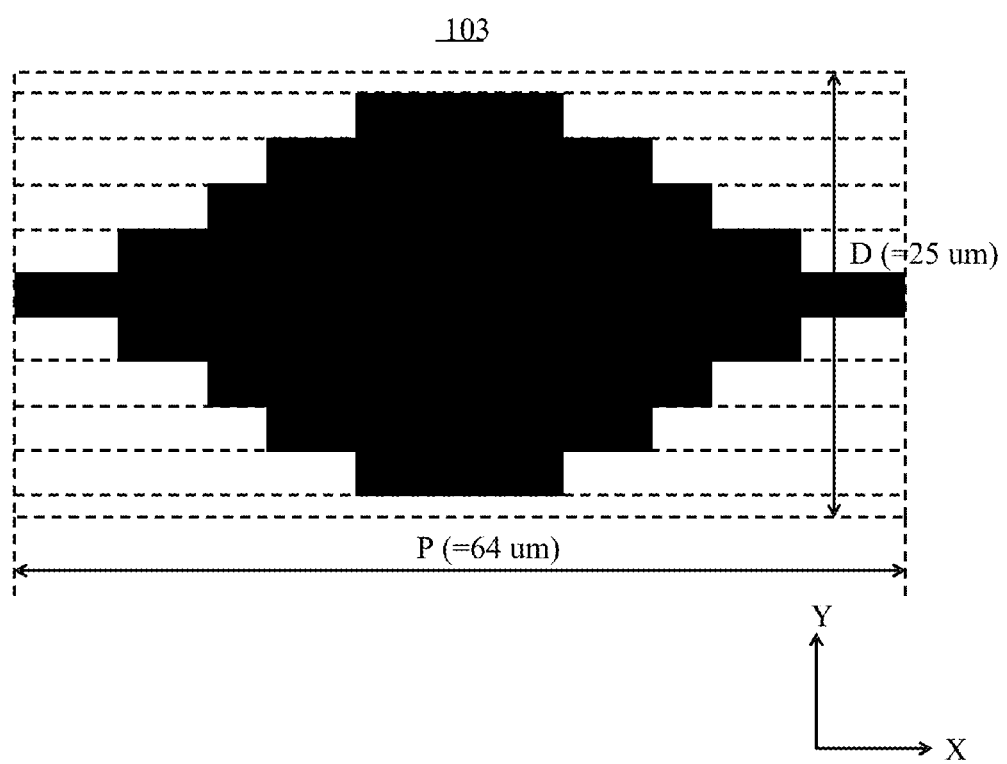
FIG. 4 is an enlarged view of a pattern.

FIGS. 3A and 3B are top views of the reflective film 102. FIG. 3A is a layout of a scale pattern of an area other than the origin position of the scale 10, and FIG. 3B is a layout of a scale pattern of an area near the origin position. In figures, a black part is a part where the reflective film 102 is patterned, and a white part is a part where the reflective film 102 is not patterned. The reflective film 102 includes a pattern (a continuous part) 103 that has a plurality of grates as illustrated in FIG. 4 and periodically varies physical characteristics, and an origin pattern (an discontinuous part) 104 that interrupts the pattern 103. The light reflected by each grate of the pattern 103 is combined and thus, a sinusoidal reflected image is formed. The pattern 103 is repeatedly formed every 64 μm in the X-axis direction from an end part of the scale 10. The origin pattern 104 is formed by a width of 256 μm in the X-axis direction, that is, a width corresponding to four wavelengths of the pattern 103. Moreover, the patterns 103 and 104 are continuously formed every 25 μm in the Y-axis direction by a length of 2000 μm.

A line represented as X=0 in FIG. 3B corresponds to the origin position of the scale 10.

Figure 5:
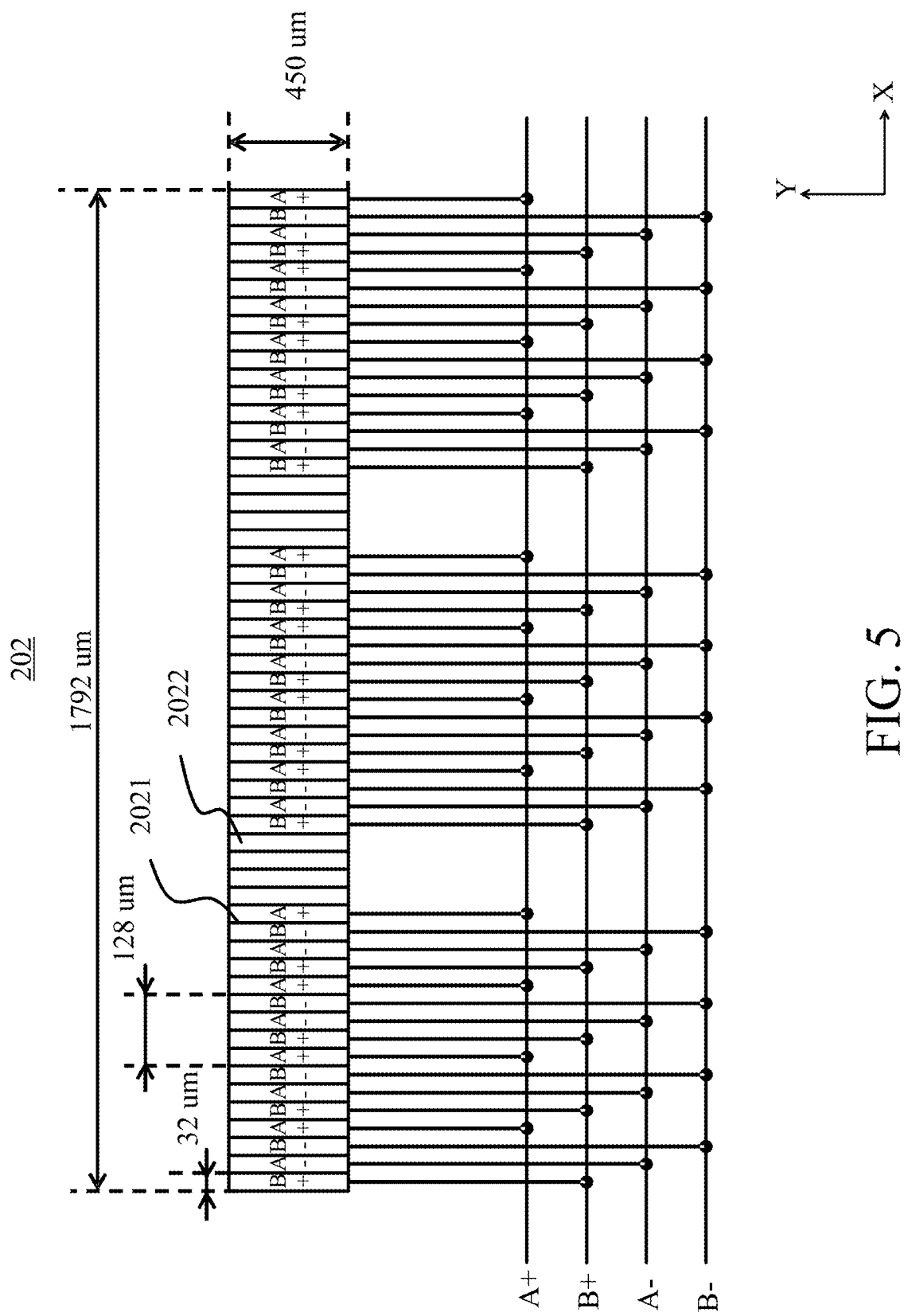
FIG. 5 is a block diagram of a light receiver.

FIG. 5 is a block diagram of the light receiver 202. Sizes in the X-axis and Y-axis directions Of the light receiver 202 are 1792 μm and 450 μm, respectively. A size in the X-axis direction of each of photodiodes (PDs) included in the light receiver 202 is 32 μm. Each of the PDs has any one of four electrical connection characteristics of A+, B+, A− and B−. Twelve PDs each having the characteristic A+ are arranged every 128 μm. Similarly, twelve PDs each having any one of the characteristics B+, A− and B− are arranged every 128 μm. The configuration that the PDs are arranged every a predetermined length is referred to as a PD array. In this example, as the divergent luminous flux configuration is used, a pitch of the reflected image every 64 μm formed by the scale on the light receiver 202 is 128 μm. That is, a spatial frequency of the reflected image formed by the scale 10 on the light receiver 202 accords with a spatial frequency of arrangement of the PDs having the characteristic A+ and thus, an electrical output of the PDs having the characteristic A+ modulates according to modulation of the reflected image based on displacement of the scale 10. The PD arrays each having any one of the characteristics B+, A− and B− are deviated from the PD array having the characteristic A+ by 32 μm, 64 μm and 96 μm, respectively. Accordingly, when an electrical signal output from each PD array having any one of each characteristic is regarded as a sinusoidal wave and a reference phase of the sinusoidal wave output from the PDs having the characteristic A+ is 0 degree, phases of the electrical signals output from the PDs having any one of the characteristics B+, A− and B− is deviated by 90, 180 and 270 degrees, respectively.

In this example, a combination of the PDs having any one of the characteristics A+, B+, A− and B− is regarded as a minimum combination of the PDs for one period of a sinusoidal period signal. A length in a detection direction of the combination of these PDs corresponds to one wavelength of the sinusoidal signal output from the detector. The light receiver 202 includes a sensitive part 2021 that is electrically connected to each PD and has sensitivity to the reflected light, and an insensitive part 2022 that is not electrically connected to each PD and has no sensitivity to the reflected light. That is, the sensitive part 2021 has sensitivity contributing to the signal for displacement detection, and the insensitive part 2022 has no sensitivity contributing to the signal for displacement detection. Connection means that each PD is connected to any one of current-voltage conversion amplifiers 204 to 207 of FIG. 6, and non-connection means that each PD is not connected to any one of the current-voltage conversion amplifiers 204 to 207. In this example, in order from a left side (a first end part) of the light receiver 202, the sensitive part 2021 corresponding to four wavelengths of the sinusoidal signal, the insensitive part 2022 corresponding to one wavelength, the sensitive part 2021 corresponding to four wavelengths, the insensitive part 2022 corresponding to one wavelength and the sensitive part 2021 corresponding to four wavelengths are arranged. That is, in this example, the sensitive parts 2021 are arranged at both ends of the light receiver 202, the insensitive parts 2022 are adjacent to the sensitive parts 2021 arranged at both ends, and the sensitive part 2021 is arranged to be sandwiched between the insensitive parts 2022.

Figure 6:
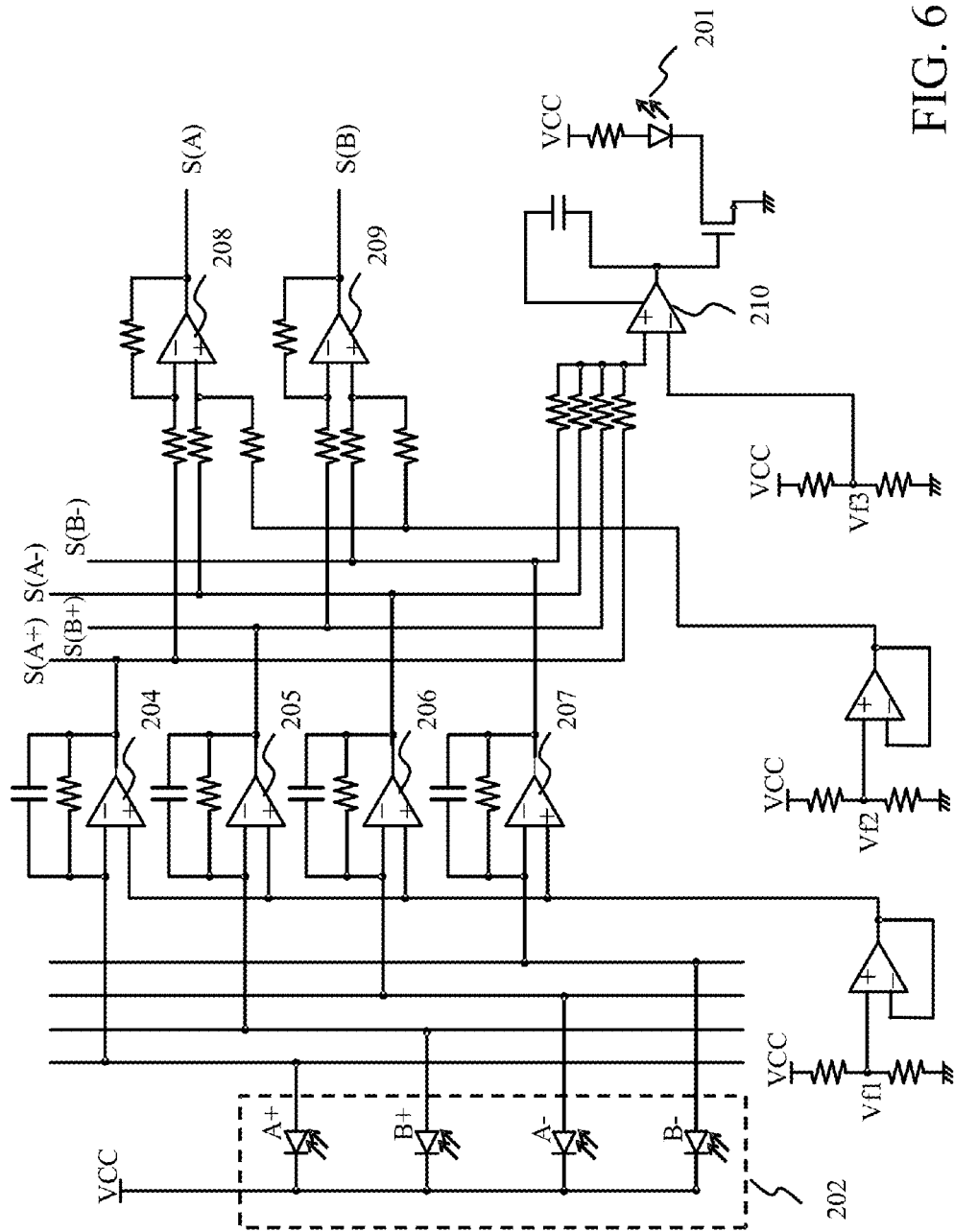
FIG. 6 is a block diagram of a displacement detector.

FIG. 6 is a block diagram of the displacement detector 20. The light emitted from the light source 201 is reflected by the scale 10 and is subsequently incident on the light receiver 202. In FIG. 6, for the purpose of simplicity, the PD arrays having any one of the characteristics A+, B+, A− and B− are treated as one PD. Signals converted into electrical currents by each PD are converted into voltage conversion signals S(A+), S(B+), S(A−) and S(B−) by the current-voltage conversion amplifiers 204 to 207. Differential amplifiers 208 and 209 respectively perform subtraction processing of the voltage conversion signals S(A+) and S(A−) and subtraction processing of the voltage conversion signals S(B+) and S(B−) to eliminate direct current component of each PD. When S(A) and S(B) are electrical signals (sinusoidal signals) of two phases output from the differential amplifiers 208 and 209, the electrical signals S(A) and S(B) are represented by the following expressions (1) and (2).

$$S(A)=S(A+)-S(A-) \quad (1)$$

$$S(B)=S(B+)-S(B-) \quad (2)$$

A comparative amplifier 210 has a function (hereinafter, referred to as "auto power control function") that controls a light emission quantity of the light source 201 to be constant by comparing a sum of voltage conversion signals converted by the current-voltage conversion amplifiers 204 to 207 with a predetermined value Vf3. When the sum of the voltage conversion signals is larger than the predetermined value Vf3, the comparative amplifier 210 determines that the light emitting quantity of the light source 201 is small and controls to increase a current quantity through the light source 201. Meanwhile, when the sum of the voltage conversion signals is smaller than the predetermined value Vf3, the comparative amplifier 210 determines that the light emitting quantity of the light source 201 is large and controls to decrease the current quantity through the light source 201. This processing is repeated until the sum of the voltage conversion signals converted by the current-voltage conversion amplifiers 204 to 207 is approximately equal to the predetermined value Vf3. The light emitting quantity of the light source 201 is proportionate to the current quantity through the light source 201. In addition, as illustrated in FIG. 6, as the current-voltage conversion amplifiers 204 to 207 are inverting amplifiers, a relation between the sum of the voltage conversion signals converted by the current-voltage amplifiers 204 to 207 and the light emitting quantity of the LED inverts.

Next, the signal processor 30 will be explained. The signal processor 30 includes a displacement accumulator 301, an origin detector 302 and an absolute position calculator 303. The displacement accumulator 301 detects relative displacement on the basis of the sinusoidal signals of two phases output from the displacement detector 20. The relative displacement is displacement that uses a position at power-on as a reference before performing origin detection, and a displacement that uses the origin position as a reference after performing the origin detection. When the displacement accumulator 301 detects the relative displacement, an AD convertor (not illustrated) first converts the sinusoidal signals of two phases into digital signals. Subsequently, arctangent operation is performed to calculate a phase from the digitalized sinusoidal signals of two phases. When A TAN 2 is the arctangent operation and φ is the phase, the phase φ (0 to 2π) is calculated by the following expression (3).

$$\varphi = A\ TAN\ 2(S(A),S(B)) \quad (3)$$

The displacement accumulator 301 detects the relative displacement by integrating variation of the phase φ. As the phase φ switches to 0 when reaching 2π, determination processing as represented by the following expression (4) is required when calculating the variation of the phase φ.

$$\mathit{diff} = \begin{cases} \varphi_n - \varphi_{n-1} (-\pi \leq \varphi_n - \varphi_{n-1} \leq \pi) \\ \varphi_n - \varphi_{n-1} + 2\pi(\varphi_n - \varphi_{n-1} < -\pi) \\ \varphi_n - \varphi_{n-1} - 2\pi(\varphi_n - \varphi_{n-1} > \pi) \end{cases} \quad (4)$$

Here, $\varphi_n$ is the latest phase, $\varphi_{n-1}$ is the previous phase immediately before calculating the latest phase, and diff is a difference between them. When the phase φ does not switch, only calculation of the difference is performed using the upper expression. When the phase switches to 0 from 2π, the difference is calculated after adding 2π using the middle expression, and when the phase switches 2π from 0, the difference is calculated after subtracting 2π using the lower expression. The relative displacement is detected by adding the calculated difference at each updating of the phase.

Figure 7:
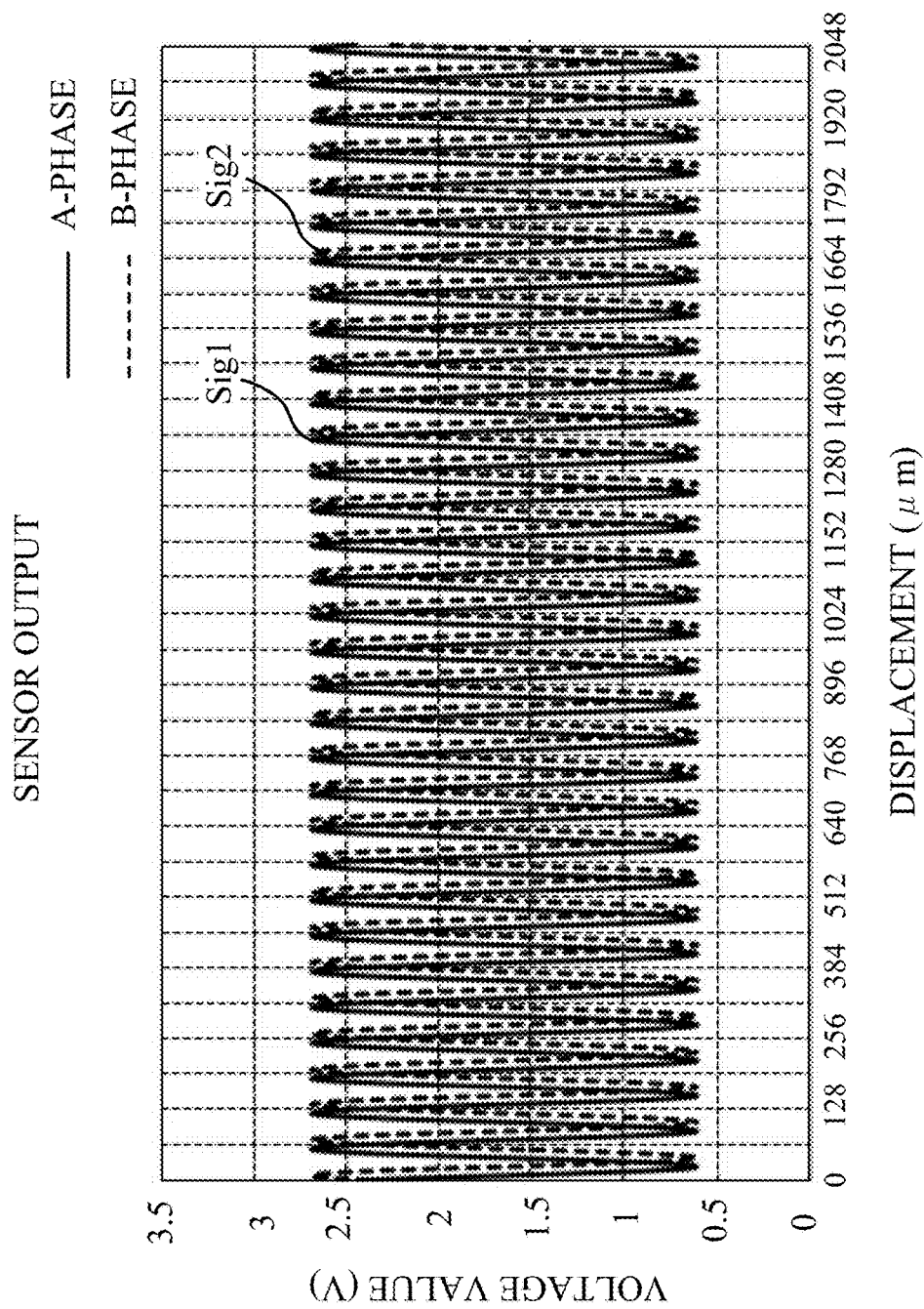
FIG. 7 is a graph indicating sinusoidal signals of two phases output from the displacement detector.

Next, a signal output using a combination of the scale 10 and the displacement detector 20 will be explained. FIG. 7 is a graph indicating the sinusoidal signals of two phases output from the displacement detector 20 on the basis of the light reflected by the pattern 103 continuously formed in the X-axis direction of FIG. 3. The A-phase sinusoidal signal is indicated by a solid line, and The B-phase sinusoidal signal is indicated by a broken line. An abscissa axis is a displacement quantity of the scale 10 and an ordinate axis is a voltage value. The sinusoidal signals of two phases are respectively modulated in 2Vp-p from a high voltage side to a low voltage side with reference to a central voltage value. The central voltage value is the voltage value Vf2 (=1.65V) of FIG. 6, and maximum displacement is 2048 μm. As the wavelength of the sinusoidal signal is 64 μm, which is a period (a pitch) of the pattern 103, modulation of the sinusoidal signal is repeated 32 times in FIG. 7. The central voltage value and the amplitude value are consistently representative values, but the present invention is not limited to these values. Especially with respect to amplitude, various values are obtained according to a factor such as reflectance of the pattern 103 or a distance between the scale 10 and the displacement detector 20.

Figure 8:
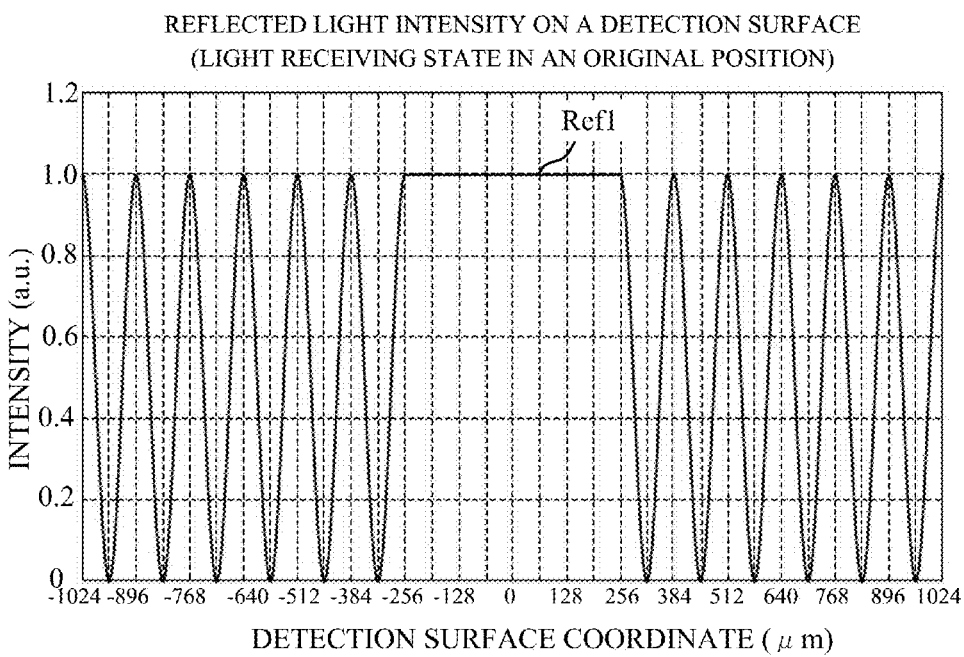
FIG. 8 is a graph indicating light intensity of reflected light reflected by a pattern in a vicinity of an origin position.

FIG. 8 is a graph indicating light intensity of the reflected light that is emitted to the scale 10 from the light source 201 and that is reflected by the reflective film 102 illustrated in FIG. 3B. An abscissa axis is a coordinate in the detection direction of the light receiver 202, and an ordinate axis is standardized light intensity. As illustrated in FIG. 8, the reflected light reflected by the pattern 103 is modulated in the detection direction, but the reflected light reflected by the origin pattern 104 is not modulated in the detection direction and has uniform intensity. In this example, as the light receiver 202 receives the reflected image twice as large as the pitch of the scale 10, the origin pattern 104, which has a width of 256 μm in the detection direction, has a width of 512 μm on the light receiver 202.

Figure 9:
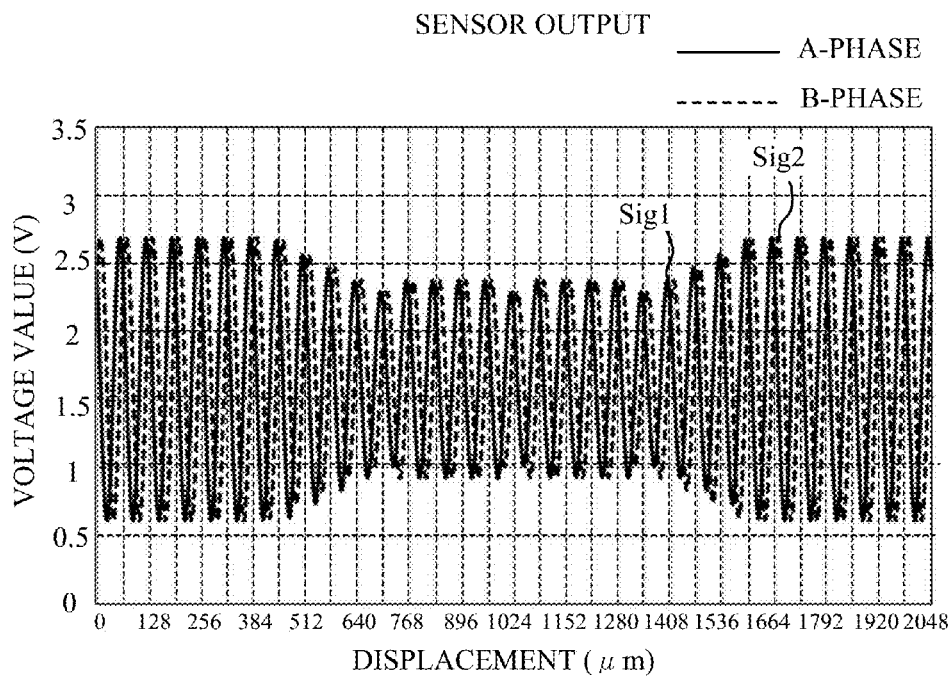
FIG. 9 is a graph indicating sinusoidal signals of two phases output from the displacement detector when reflected light from the vicinity of the origin position is received.

FIG. 9 is a graph indicating sinusoidal signals of two phases output from the displacement detector 20 when the light receiver 202 receives the reflected light from the vicinity of the origin position. The A-phase sinusoidal signal is indicated by a solid line, and the B-phase sinusoidal signal is indicated by a broken line. An abscissa axis is the displacement quantity of the scale 10 and an ordinate axis is the voltage value. In FIG. 9, according to displacement relative to the scale 10, the reflected light reflected by the origin pattern 104 becomes from a state not entering into the light receiver 202 to a state gradually entering into the light receiver 202 along the detection direction, and finally passes through the light receiver 202. When the displacement quantity is 1024 μm, the reflected light reflected by the origin pattern 104 is located in a middle point in the detection direction of the light receiver 202. In other words, the reflected light reflected by the origin pattern 104 covers with the sensitive part 2021 of the light receiver 202 sandwiched between the insensitive parts 2022. Amplitude of light intensity decreases when the reflected light reflected by the origin pattern 104 enters into the light receiver 202, but increases when the reflected light starts to be received by the insensitive part 2022.

Responses of the PDs each having any one of the characteristics A+, B+, A− and B− are represented by the following expressions (5) to (8).

$$S(A+) = \int_{-\infty}^{\infty} f_1(x) * g(x+\Delta x) dx \quad (5)$$

$$S(B+) = \int_{-\infty}^{\infty} f_2(x) * g(x+\Delta x) dx \quad (6)$$

$$S(A-) = \int_{-\infty}^{\infty} f_3(x) * g(x+\Delta x) dx \quad (7)$$

$$S(B-) = \int_{-\infty}^{\infty} f_4(x) * g(x+\Delta x) dx \quad (8)$$

Here, $f_1(x)$, $f_2(x)$, $f_3(x)$ and $f_4(x)$ are respectively a distribution function of PDs each having any one of the characteristics A+, B+, A− and B−, $g(x)$ is a function of intensity of modulated light of the reflected light reflected by the scale 10, and $\Delta x$ is the displacement of the scale 10.

Additionally, when S(PDtotal) is approximate response of all PDs each having any one of the characteristics A+, B+, A− and B−, and $f_5(x)$ ($=f_1(x)+f_2(x)+f_3(x)+f_4(x)$) is a distribution function of the all PDs, the approximate response S(PDtotal) is calculated by the following expression (9).

$$S(\text{PDtotal}) = \int_{-\infty}^{\infty} f_5(x) * g(x+\Delta x) dx \quad (9)$$

Figure 10:
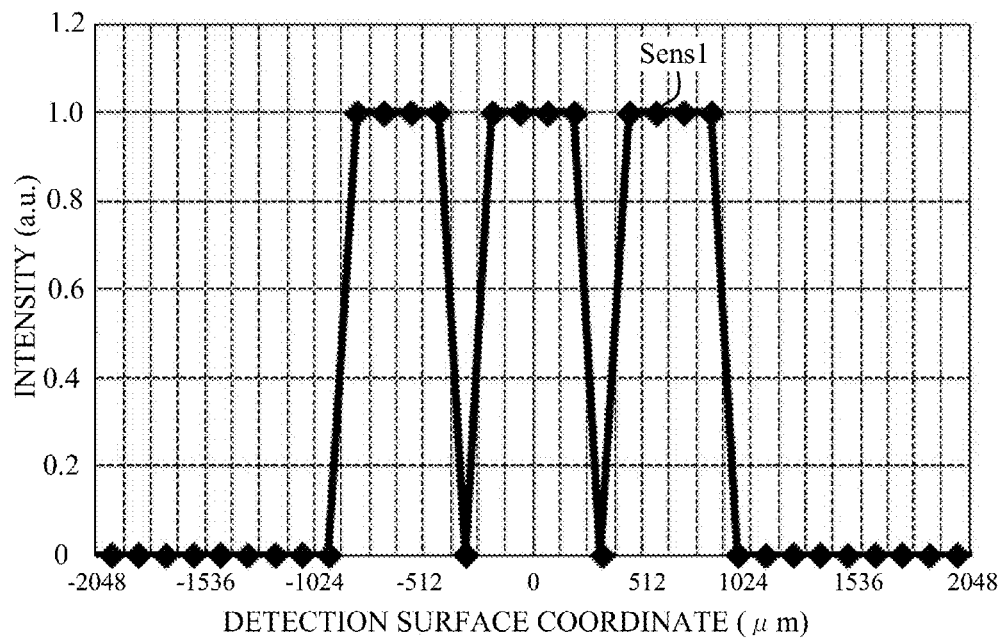
FIG. 10 is a graph indicating sensitivity distribution of the displacement detector.
Figure 11:
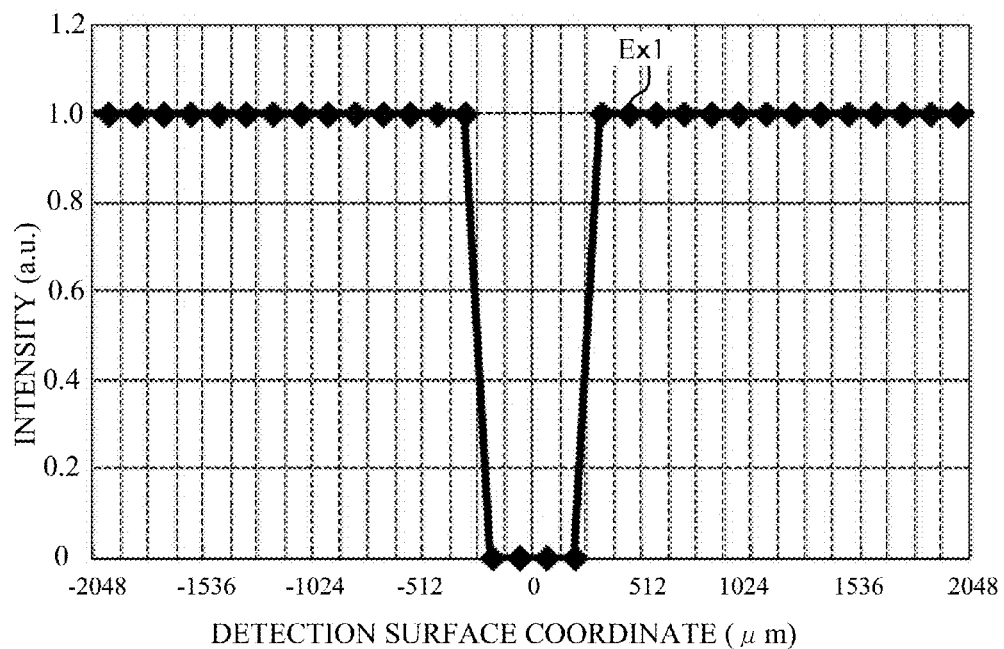
FIG. 11 is a graph indicating light intensity of modulation light of the reflected light reflected by the pattern in the vicinity of the origin position.

The distribution function $f_5(x)$ is, as illustrated in FIG. 10, is a discrete function obtained by plotting sensitivity of one unit, which is composed of the PDs each having any one of the characteristics A+, B+, A− and B−, every 128 μm in the detection direction. In FIG. 10, an abscissa axis is the coordinate of the light receiver 202 in the detection direction and an ordinate axis is a value obtained by standardizing sensitivity having the PDs. The function $g(x)$ is, as illustrated in FIG. 11, a discrete function obtained by plotting modulation light intensity every 128 μm in the detection direction. In FIG. 11, an abscissa axis is the coordinate of the light receiver 202 in the detection direction, and an ordinate axis is a value obtained by standardizing intensity of the modulated light. The function $g(x)$ is 1 when the reflected light reflected by the reflective film 102 is modulated on the detection surface of the light receiver 202 every distribution of the pattern 103 illustrated in FIG. 4, but is 0 when the reflected light is not modulated.

Figure 12A:
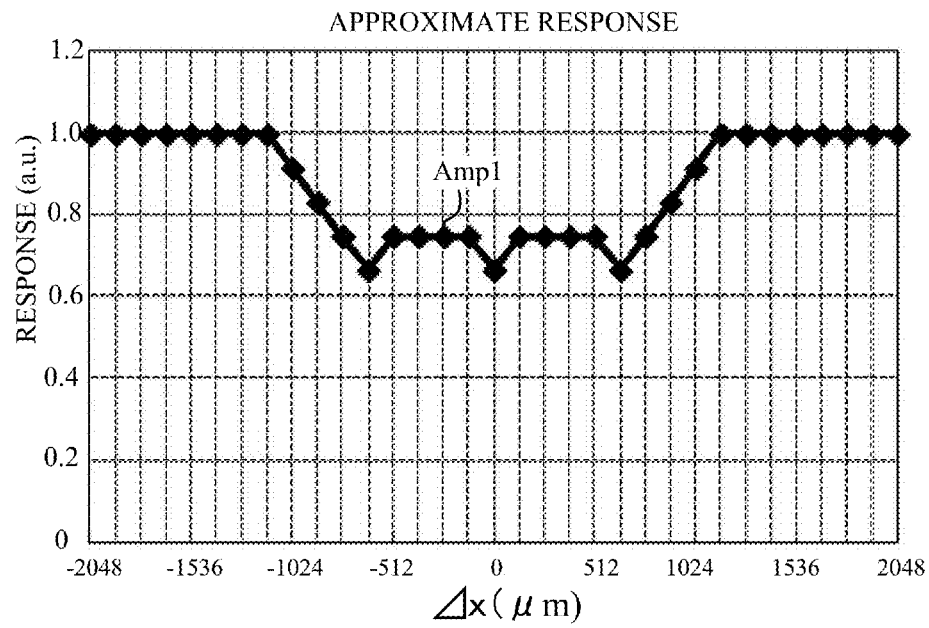
FIGS. 12A and 12B are graphs indicating approximate response of the displacement detector.

FIG. 12A is a graph indicating the approximate response S calculated using the expression (9). An abscissa axis is displacement of the scale 10 converted to be a value on the light receiver 202, and an ordinate axis is a value obtained by standardizing signal intensity of the signal output from the displacement detector 20.

First, variation of the signal intensity when the displacement $\Delta x$ changes from the minus sign to the plus sign will be explained. As illustrated in FIG. 12A, the signal intensity of the signal output from a region of the light receiver 202 that receives the reflected light reflected by the origin pattern 104 is smaller than the signal intensity of the signal output from a region of the light receiver 202 that fails to receive the reflected light reflected by the origin pattern 104. In this example, the signal intensity decreases from a time when the displacement $\Delta x$ is −1024 μm, and is the smallest at a time when the displacement $\Delta x$ is −640 μm. When the reflected light reflected by the origin pattern 104 starts to be incident on the insensitive part 2022 of the light receiver 202, the signal intensity temporarily increases. This is because the insensitive part 2022 has no sensitivity to the reflected light reflected by the origin pattern 104. The insensitive part 2022 has a length in the detection direction corresponding to one wavelength of the sinusoidal signal, and the origin pattern 104 has a length in the detection direction corresponding to four wavelengths of the sinusoidal signal. Accordingly, a state that the insensitive part 2022 fails to detect the reflected light reflected by the origin pattern 104 continues for four wavelengths of the sinusoidal signal. In particular, the state continues from a state that the displacement $\Delta x$ is −512 μm to a state the displacement $\Delta x$ is −128 μm. When the reflected light reflected by the origin pattern 104 is not received by the insensitive part 2022 and covers with the sensitive part 2021 sandwiched by the insensitive parts 2022, that is, the displacement $\Delta x$ is 0 μm, the signal intensity becomes the smallest again. As the PDs of the light receiver 202 are arranged symmetrically with respect to a central part, the signal illustrated in FIG. 12A is symmetrical with respect to the signal intensity when the displacement $\Delta x$ is 0 μm. In this example, the variation of the signal intensity when the displacement $\Delta x$ changes from the minus sign to the plus sign was explained, and, as illustrated in FIG. 12A, when the displacement $\Delta x$ changes from the plus sign to the minus sign, a sign of the displacement $\Delta x$ only inverts, but the variation of the signal intensity is the same.

The response of the displacement detector 20 explained in FIG. 12A fails to consider the auto power control function. Considering the auto control power function leads to a result different from the result of FIG. 12A. An area where the reflective film 102 is patterned in an area region of the origin pattern 104 corresponding to one wavelength of the sinusoidal signal is larger than an area of the pattern 103 where the reflective film 102 is not patterned in an area region corresponding to one wavelength of the sinusoidal period signal. The light quantity of the reflected light reflected by the scale 10 approximately is proportional to the area where the reflective film 102 is patterned. Accordingly, when the sensitive part 2021 of the light receiver 202 starts to receive the reflected light reflected by the origin pattern 104, the light quantity which the sensitive part 2021 receives increases. Thus, the auto power control function controls to decrease the light quantity. When the auto power control function is considered, a reduction of the light intensity due to light reception of the reflected light reflected by the origin pattern 104 using the sensitive part 2021 becomes more apparent.

Figure 12B:
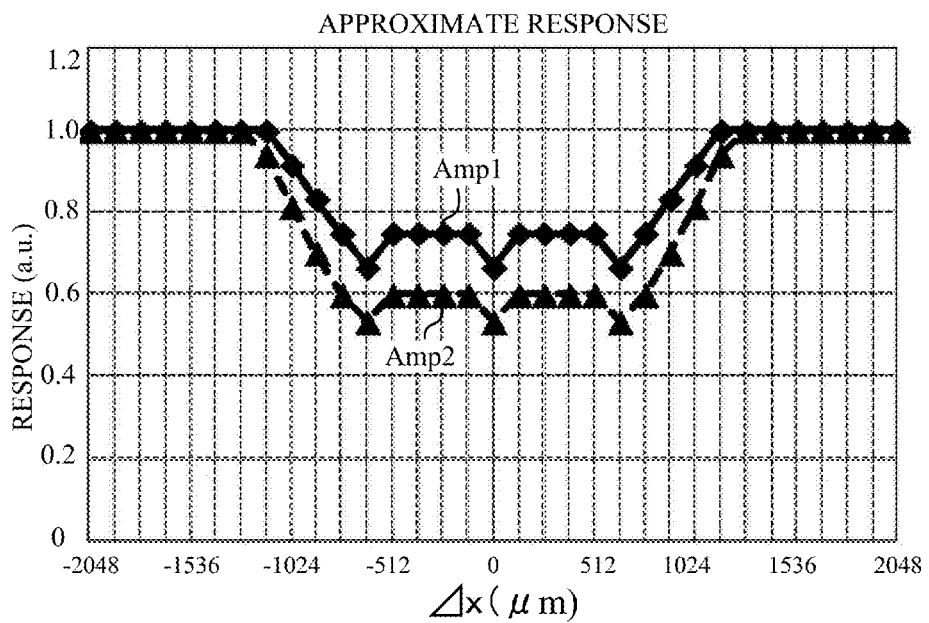

In FIG. 12B, approximate response (a solid line) obtained by performing an approximation without considering the auto power control function and approximate response (a broken line) obtained by performing an approximation in consideration of the auto power control function are indicated. An abscissa axis is the displacement of the scale 10 converted to be the value on the light receiver 202, and an ordinate axis is the value obtained by standardizing the signal intensity of the signal output from the displacement detector 20. In a region where the signal intensity decreases, a decrease rate of the signal intensity in the approximate response in consideration of the auto power control function is larger than that in the approximate response without considering the auto power control function. In either of the approximations, when the insensitive part 2022 starts to receive the reflected light, the signal intensity increases. In the present invention, as a positional relation between a region where the signal intensity decreases and a region where the signal intensity increases is used as a criterion for determining of the origin detection, magnitude of the decrease rate of the signal intensity in the region where the signal intensity decreases matters little. Accordingly, in the following explanations, the auto power control function is not considered in performing the origin detection.

Figure 13:
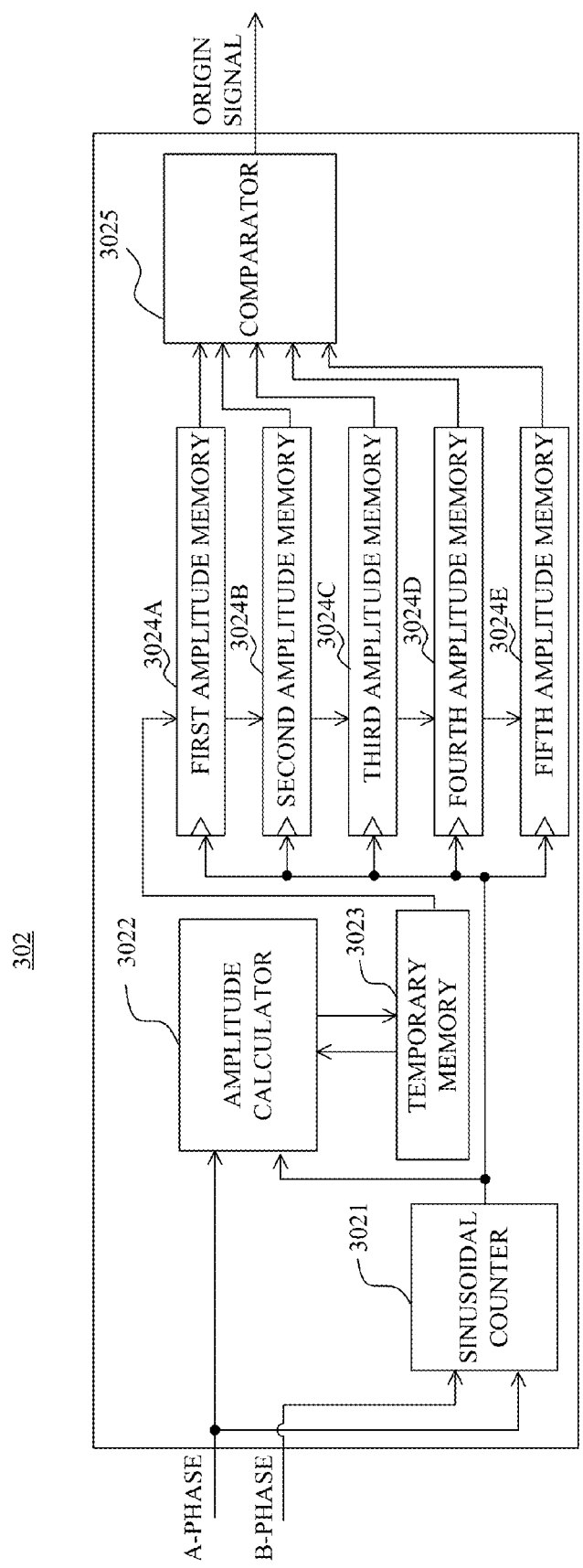
FIG. 13 is a block diagram of an origin detector (the first example).
Figure 14:
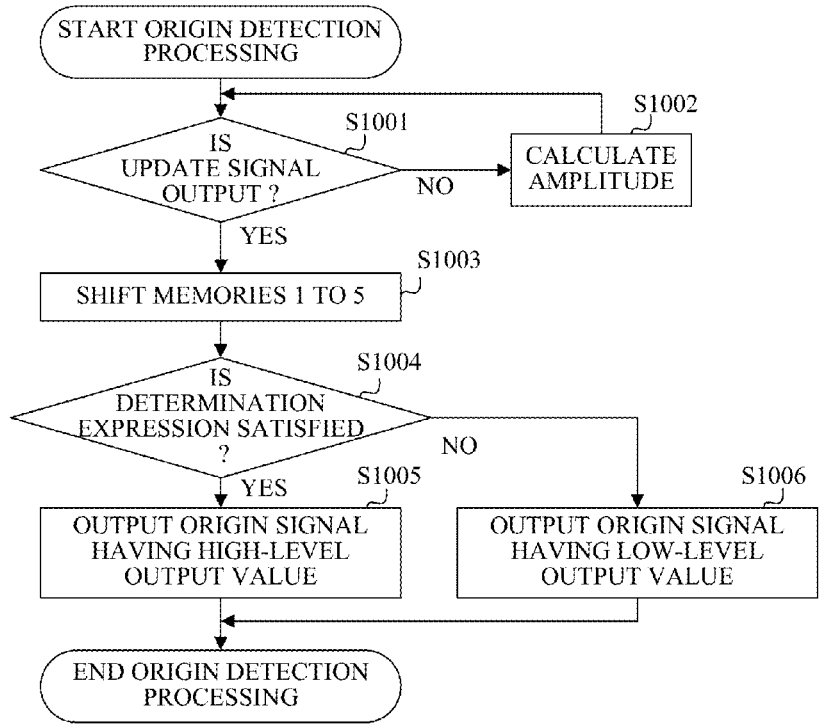
FIG. 14 is a flowchart of origin detection processing by the origin detector (the first example).

Next, the origin detection will be explained in reference to FIGS. 13 and 14. FIG. 13 is a block diagram of the origin detector 302, and FIG. 14 is a flowchart of the origin detection processing by the origin detector 302.

A sinusoidal counter 3021 first updates a count value of a counter provided inside using a combination of the A-phase and B-phase sinusoidal signals. The count value is reset to 0 immediately after power on and is updated for each wavelength of the sinusoidal signal. Specifically, in a waveform illustrated in FIG. 9, the sinusoidal counter 3021 increases or decreases the count value according to a direction of movement of the scale 10 when the voltage values of the A-phase and B-phase signals are lower than a central voltage value and a mutually crossing point is detected. The sinusoidal counter 3021 outputs update signals to an amplitude calculator 3022 and first to fifth amplitude memories 3024A to 3024E at a timing where the count value is increased or decreased. The count value is reset to 0 after outputting the update signals. Accordingly, the count value of the sinusoidal counter 3021 is any one of −1, 0 and 1, and outputs the update signals when the count value changes from 0 to 1 or from 0 to −1. At step S1001, presence or absence of these update signals is determined, and if the update signals exist, the flow is advanced to step S1003, otherwise the flow is advanced to step S1002.

The amplitude calculator 3022 monitors a value of the A-phase signal, and holds the minimum value and the maximum value of the signal values. When absence of the update signals is determined at step S1001, the amplitude calculator 3022 calculates an amplitude value ampl from the holding minimum and maximum values at step S1002. When max(S(A)) and min(S(A)) are respectively the maximum and minimum values of the A-phase signal, the amplitude value ampl is calculated by the following expression (10).

$$ampl=\max(S(A))-\min(S(A)) \quad (10)$$

A temporary memory 3023 is used to calculate an amplitude value for each displacement of one wavelength of the sinusoidal signal, and holds the maximum and minimum values of the A-phase signal in addition to the amplitude value. The first to fifth amplitude memories 3024A to 3024E respectively hold the amplitude value of the A-phase signal. The first to fifth amplitude memories 3024A to 3024E, which are shift registers, hold and shift the amplitude values by the update signal obtained from the sinusoidal counter 3021.

At step S1003, the temporary memory 3023 first outputs the calculated amplitude value to the first amplitude memory 3024A at a timing where the update signal is output from the sinusoidal counter 3021. The value holding the temporary memory 3023 is reset by the update signal output from the sinusoidal counter 3021. In particular, the amplitude value is reset to 0V, and the minimum and maximum values are reset to 1.65V, which is the central voltage value. The first amplitude memory 3024A incorporates the amplitude value output from the temporary memory 3023, and outputs the amplitude value held until then to the second amplitude memory 3024B. The second amplitude memory 3024B obtains the amplitude value output from the first amplitude memory 3024A, and outputs the amplitude value held until then to the third amplitude memory 3024C. The third and fourth amplitude memories 3024C and 3024D perform the same processing. The fifth amplitude memory 3024E incorporates the amplitude value output from the fourth amplitude memory 3024D, and cancels the amplitude value held until then.

By the above processing, the first to fifth amplitude memories 3024A to 3024E can hold the amplitude value of the A-phase signal of five wavelengths in the sinusoidal signal. Additionally, the first amplitude memory 3024A holds the latest amplitude value, the second to fourth amplitude memories 3024B to 3024D respectively hold second, third and fourth amplitude values in this order. The fifth amplitude memory 3024E holds the oldest amplitude value.

At step S1004, a comparator 3025 compares the amplitude values held by the first to fifth amplitude memories 3024A to 3024E, and determines whether these values satisfy the following conditions 1 to 4. At step S1005, when comparison results satisfy all of the following conditions 1 to 4, the comparator 3025 determines an output value of the origin signal as a high-level, and outputs the origin signal having the high-level output value. At step S1006, the output value of the origin signal is determined as a low-level, and the origin signal having the low-level output value is output.

(Condition 1) The amplitude value held by the first amplitude memory 3024A is larger than the amplitude value held by the second amplitude memory 3024B.

(Condition 2) The amplitude value held by the second amplitude memory 3024B is smaller than the amplitude value held by the third amplitude memory 3024C.

(Condition 3) The amplitude value held by the third amplitude memory 3024C is smaller than the amplitude value held by the fourth amplitude memory 3024D.

(Condition 4) The amplitude value held by the fourth amplitude memory 3024D is smaller than the amplitude value held by the fifth amplitude memory 3024E.

The output value of the origin signal determined by the comparator 3025 is held until the sinusoidal counter 3021 outputs the next update signal. That is, the origin signal having the high-level output value is output only in a specific wavelength region in the sinusoidal signal.

Here, the conditions 1 to 4 will be explained in reference to FIG. 12A. In FIG. 12A, when the displacement Δx changes from the minus sign to the plus sign, the conditions 1 to 4 are satisfied in the case where the displacement Δx is −384 μm and are not satisfied in the case where displacement Δx is the other value. Then, the amplitude calculator 3022 calculates the amplitude value when the displacement Δx is −384 μm. Moreover, the first to fifth amplitude memories 3024A to 3024E hold the amplitude values when the displacement Δx are −512 μm, −640 μm, −768 μm, −896 μm and −1024 μm, respectively.

Meanwhile, when the displacement Δx changes from the plus sign to the minus sign, the conditions 1 to 4 are satisfied in the case where the displacement Δx is −384 μm and are not satisfied in the case where displacement Δx is the other value. Then, the amplitude calculator 3022 calculates the amplitude value when the displacement Δx is 384 μm. Moreover, the first to fifth amplitude memories 3024A to 3024E hold the amplitude values when the displacement Δx are 512 μm, 640 μm, 768 μm, 896 μm and 1024 μm, respectively.

The conditions 1 to 4 are all relative comparisons of the amplitude values and do not include absolute value elements. Accordingly, even if components of the modulated light, which is used to detect the displacement of the scale 10, of the reflected light reflected by the reflective film 102 are small and signal amplitude uniformly decreases, the origin detection can be performed. Even if the signal amplitude uniformly increases, the origin detection can be also performed.

The absolute position calculator 303 resets an accumulation position when, in the wavelength of the sinusoidal signal where the origin detector 302 outputs the origin signal having the high-level output value, the A-phase and B-phase signals have voltages higher than the central voltage and the mutually crossing point is detected. The timing to reset the accumulation position is not limited to this timing, and the combination of the A-phase and B-phase signals may be arbitrarily determined while the origin detector 302 outputs the origin signal having the high-level output value, that is, during one specific wavelength in the A-phase and B-phase sinusoidal signals of the displacement detector 20.

In FIG. 12A, the absolute position calculator 303 resets the accumulation position to −192 μm when the origin signal is output while the displacement Δx changes from the minus sign to the plus sign, and resets the accumulation position to 192 μm when the origin signal is output while the displacement Δx changes from the plus sign to the minus sign. This will be specifically explained in reference to FIG. 9. The displacement of the scale 10 of 1024 μm in FIG. 9 corresponds to the displacement Δx of 0 μm in FIG. 12A. In this example, based on the displacement of the scale 10 of 1024 μm, the explanation is performed. The combination of values of the A-phase and B-phase signals when the displacement is 1024 μm is the same as the combination to reset the accumulation position in the wavelength of the sinusoidal signal where the origin detector 302 outputs the origin signal having the high-level output value. The displacement of the position where the origin is detected while the displacement changes from 0 μm to 1024 μm is 832 μm. Then, the amplitude calculator 3022 calculates the amplitude value when the displacement is 832 μm. Additionally, the first to fifth amplitude memories 3024A to 3024E hold the amplitude values when the displacements are 768 μm, 704 μm, 640 μm, 576 μm and 512 μm, respectively. Then, the absolute position calculator 303 sets the accumulation position when the displacement is 832 μm to −192 μm (=832 μm−1024 μm) to make the accumulation position when the displacement is 1024 μm 0 μm. Meanwhile, the displacement of the position where the origin is detected while the displacement changes from 2048 μm to 1024 μm is 1216 μm. Then, the amplitude calculator 3022 calculates the amplitude value when the displacement is 1216 μm. Additionally, the first to fifth amplitude memories 3024A to 3024E hold the amplitude values when the displacements are 1280 μm, 1344 μm, 1408 μm, 1472 μm and 1536 μm, respectively. Then, the absolute position calculator 303 sets the accumulation position when the displacement is 832 μm to 192 μm (=1216 μm−1024 μm) to make the accumulation position when the displacement is 1024 μm 0 μm. Thus, in this example, the reset of the accumulation position to 0 μm can be quickly performed at the same position without depending on the direction of the origin detection.

The above configuration can perform high-performance origin detection capable of making a position gap relative to a displacement detection signal smaller, reducing erroneous detection of origin position due to amplitude changes, and quickly performing a reset of an accumulation position to 0 μm at the same position without depending on a direction of origin detection.

In this example, making the area covered with the reflective film 102 of the origin pattern 104 larger than that of the pattern 103 decreases the modulation intensity of the reflected light, but a method to reduce the modulation intensity of the reflected light is not limited to this. For example, the method may be realized by removing a region of the pattern 103 corresponding to one period (the pitch) of the origin pattern 104. Removing means that the pattern 103 is not arranged on a position where the pattern 103 normally exists on the scale 10.

Additionally, if the sensitive and insensitive parts are arranged in the above order as this example, lengths in the detection direction of the sensitive and insensitive parts are not limited to the lengths in this example. Moreover, in this example, the sensitive and insensitive parts are symmetrically arranged in the detection direction of the light receiver 202, but the present invention is not limited to this. When the arrangement of the sensitive and insensitive parts is not symmetrical in the detection direction, the determination expression for the origin detection may be changed according to the detection direction.

In this example, the displacement detector 20 outputs the signals of two-phases, but may output signals of three or more phases if the displacement detection, calculation of the signal intensity, and the origin detection can be performed.

In this example, as illustrated in FIG. 13, processing regarding the origin detection is performed using the hardware, but the present invention is not limited to this if the same processing can be performed. For example, the processing may be performed using a software. Realization using the hardware can accept moving speed of a high-speed scale, and can quickly output the origin signal after determining the origin position compared to realization using the software. Meanwhile, realization using the software can flexibly correspond even if the arrangement of the PD arrays of the light receivers 202 and a locus of signal intensity variations due to changes of the origin pattern are changed.

In this example, the origin detector 302 transmits whether or not the origin is detected by outputting the signal having the high-level or low-level output value, but signals are not limited to them. For example, serial values different between when detecting the origin and when not detecting the origin may be transmitted.

Second Example

Figure 15:
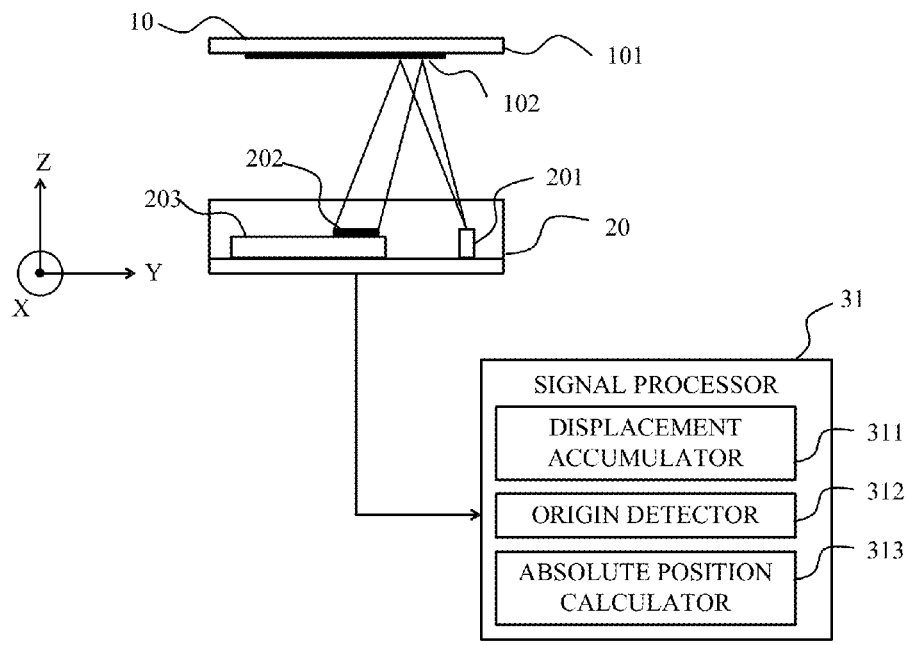
FIG. 15 is a schematic diagram of an encoder viewed from a detection axis direction (a second example).

An encoder according to this example is different in an internal configuration and processing of an origin detector and processing of an absolute position calculator from the encoder according to the first example. The encoder according to this example is illustrated in FIG. 15. In FIG. 15, parts other than an origin detector 312 and an absolute position calculator 313 provided in a signal processor 31 are the same as that of the first example, and thus the explanations thereof are omitted.

Figure 16:
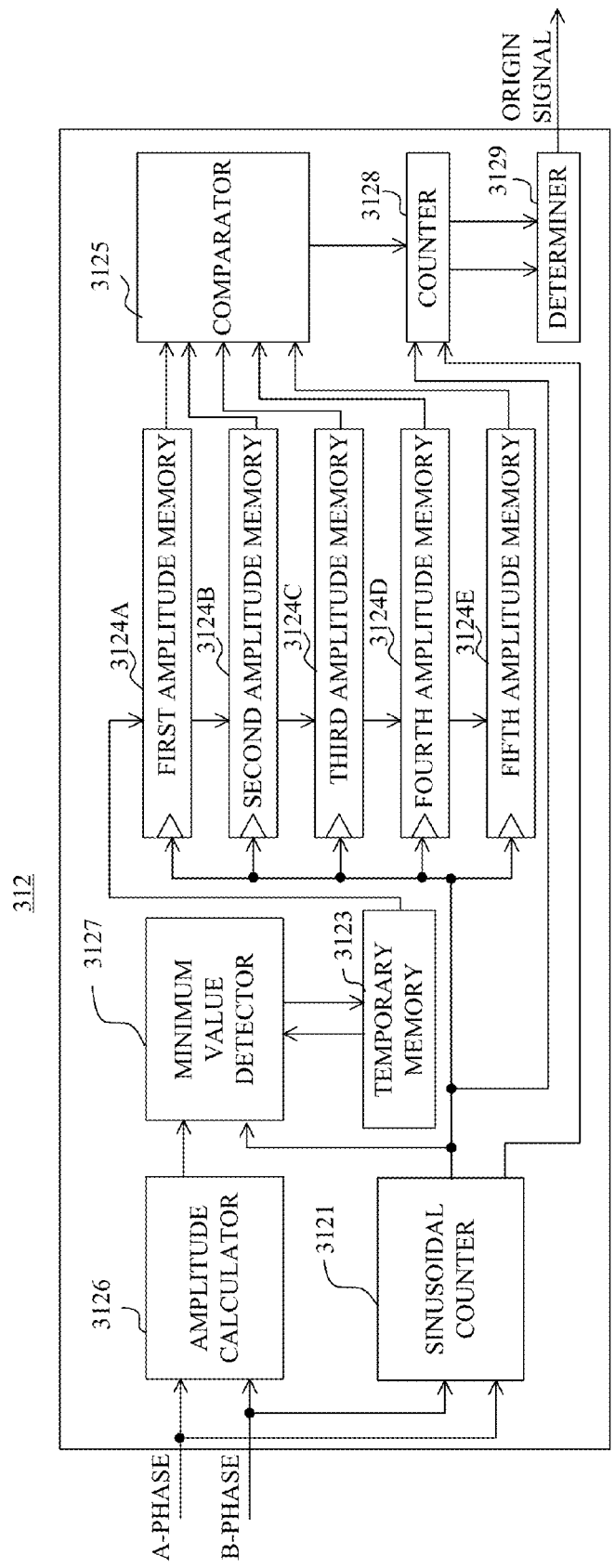
FIG. 16 is a block diagram of an origin detector (the second embodiment).
Figure 17:
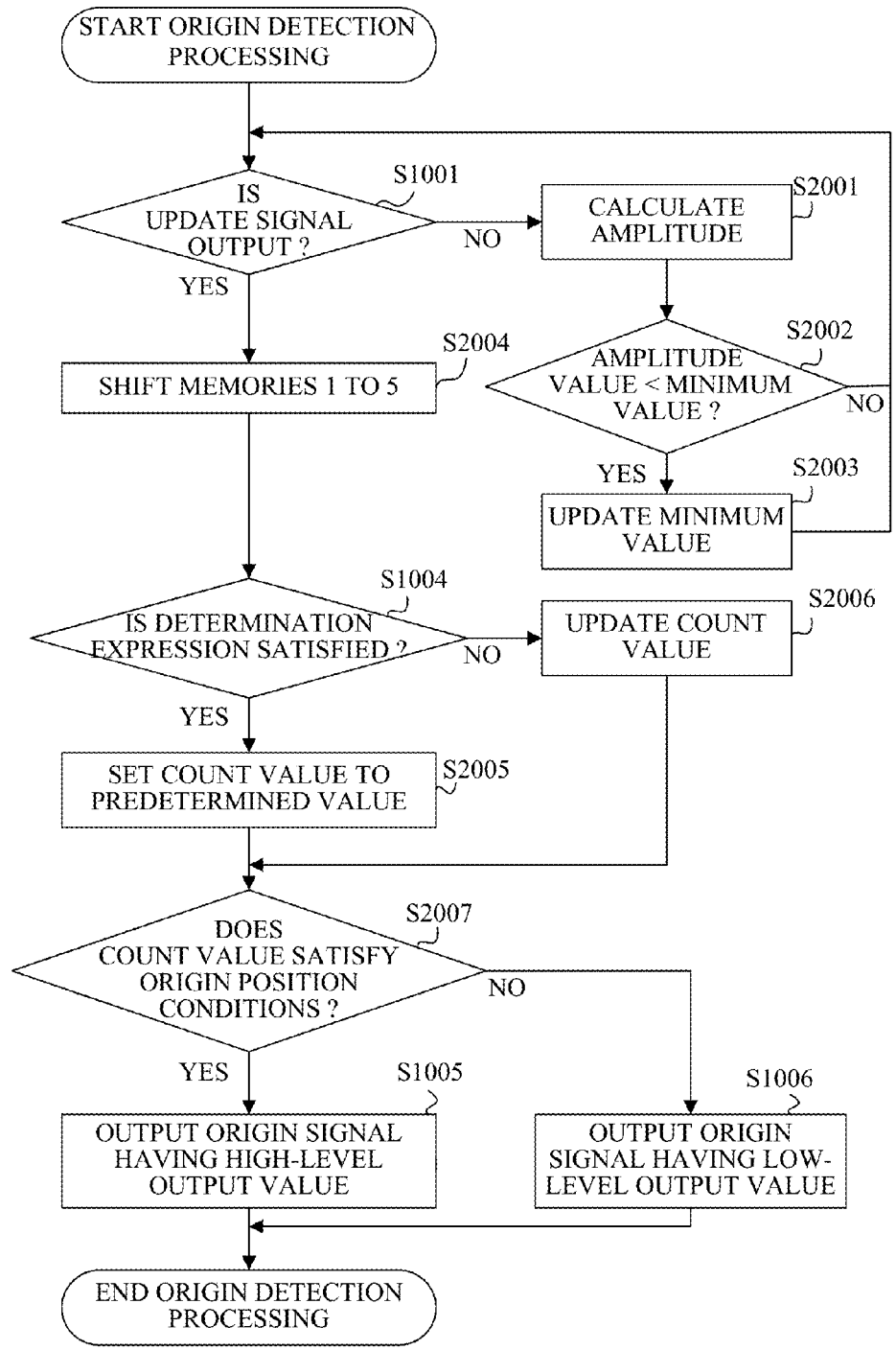
FIG. 17 is a flowchart of origin detection processing by the origin detector (the second example).

Origin processing according to this example will be explained in reference to FIGS. 16 and 17. FIG. 16 is a block diagram of the origin detector 312, and FIG. 17 is a flowchart of the origin detection processing by the origin detector 312. Explanations of configurations and processing similar to that of the first example are omitted.

At step S2001, an amplitude calculator 3126 calculates a square root of a square sum of the A-phase and B-phase signals output from the displacement detector 20 using the following expression (11) to calculate an amplitude value lissa.

$$\text{lissa} = \sqrt{S(A)^2 + S(B)^2} \tag{11}$$

Figure 18:
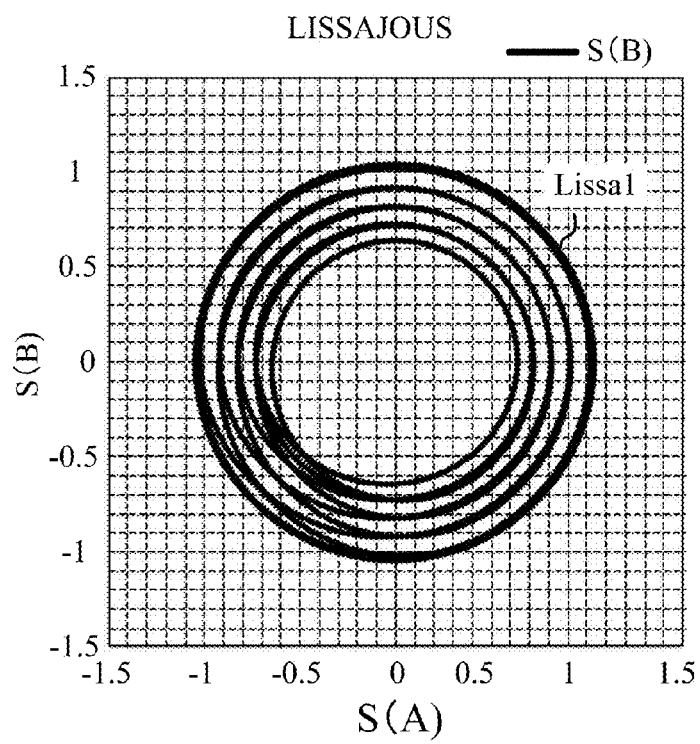
FIG. 18 is a graph indicating an amplitude value based on A-phase and B-phase signals output from a displacement detector when an abscissa and ordinate axes are respectively the A-phase and B-phase signals (the second example).

FIG. 18 is a graph indicating the amplitude value lissa based on the A-phase and B-phase signals of the displacement detector 20 when an abscissa and ordinate axes are respectively the A-phase and B-phase signals.

At step S2002, a minimum detector 3127 compares the amplitude value lissa calculated by the amplitude calculator 3126 with a minimum value of the amplitude valued held by the temporary memory 3123. When the amplitude value is smaller than the minimum value, the minimum value held by the temporary memory 3123 is updated to the amplitude value lissa at step S2003.

At step S2004, when the sinusoidal counter 3121 outputs an update signal, the minimum detector 3127 outputs the minimum value of the amplitude values held by the temporary memory 3123 to a first amplitude memory 3124A. After output by the minimum value detector 3127, the minimum value held by the temporary memory 3123 is reset to 3.3V. The following processing is the same as the processing at step S1003 of FIG. 14, the first to fifth amplitude memories 3124A to 3124E hold amplitude values of five periods (five pitches). If comparison results satisfy all of the conditions 1 to 4 at step S1004, the flow is advanced to step S2005, otherwise the flow is advanced to step S2006.

The sinusoidal counter 3121 outputs the update signal and a direction determination signal determined by a direction of changes of the count value of the sinusoidal counter 3121 to the counter 3128. The direction determination signal has a high-level output value when the count value changes from 0 to 1, and has a low-level output value when the count value changes from 0 to −1.

At step S2006, the counter 3128 updates the count value according to the update signal and the direction determination signal output from the sinusoidal counter 3121. On the scale 10, the pattern 103 are formed for 1560 periods, but the counter 3128 has a numerical width of signed 12 bits and thus the count value of the counter 3128 becomes an abnormal value in the middle of a count regardless of presence or absence of the sign. The count value of the counter 3128 is reset to 0 immediately after power on. The counter 3128 increases or decreases the count value on the basis of a level of the update signal and the direction determination signal output from the sinusoidal counter 3121 while the comparator 3125 outputs the signal having the low-level output value, that is, fails to detect the origin.

At step S2007, when the comparator 3125 outputs the high-level signal, the counter 3128 switches a value set to the count value on the basis of a condition of the direction determination signal. When the comparator 3125 outputs the high-level signal and the direction determination signal is a high-level, in FIG. 12A, the origin is detected while the displacement Δx changes from the minus sign to 0. As explained in the first example, the displacement Δx in the case where the origin is detected while the displacement Δx changes from the minus sign to 0 is −384 μm, and if the sinusoidal signal is displaced by three wavelengths, the displacement Δx becomes 0 μm. Then the counter 3128 sets the count value to −3. When the comparator 3125 outputs the high-level signal and the direction determination signal is a low-level, in FIG. 12A, the origin is detected while the displacement Δx changes the plus sign to 0. As explained in the first example, the displacement Δx in the case where the origin is detected while the displacement Δx changes from the plus sign to 0 is 384 μm, and if the sinusoidal signal is displaced by minus three wavelengths, the displacement Δx becomes 0 μm. Then the counter 3128 sets the count value to 3. In any case, when the count value is newly set by the origin detection, the counter 3128 outputs a count value update signal to a determiner 3129. In particular, the counter 3128 outputs the low-level signal until the count value is set by the origin detection immediately after power on, and outputs the high-level signal after the count value is set by the origin detection.

At step S2008, the determiner 3129 determines whether or not the origin is reached on the basis of the count value and the count value update signal, which are output from the counter 3128. When the count value is 0 and the count value update signal is the high-level, it is determined that the scale 10 reaches the origin position, and the signal having the high-level output value is output as the origin signal. When the count value is not 0 or the count value update signal is the low-level, the signal having the low-level output value is output as the origin signal.

The absolute position calculator 313 resets the accumulation position to 0 when the A-phase and B-phase signals have voltages larger than the central voltage and the point where the both phase signals mutually cross is detected in the wavelength of the sinusoidal signal where the origin detector 312 outputs the origin signal having the high-level output value.

According to the above configuration, the present invention can be applied to the encoder including the absolute position calculator 303 that fails to include a changing function of the set value of the accumulation position according to a direction as the first example. In this example, as with the first example, a system different from the detection method of the signal and the configuration of the processor may be used.

Third Example

Figure 19:
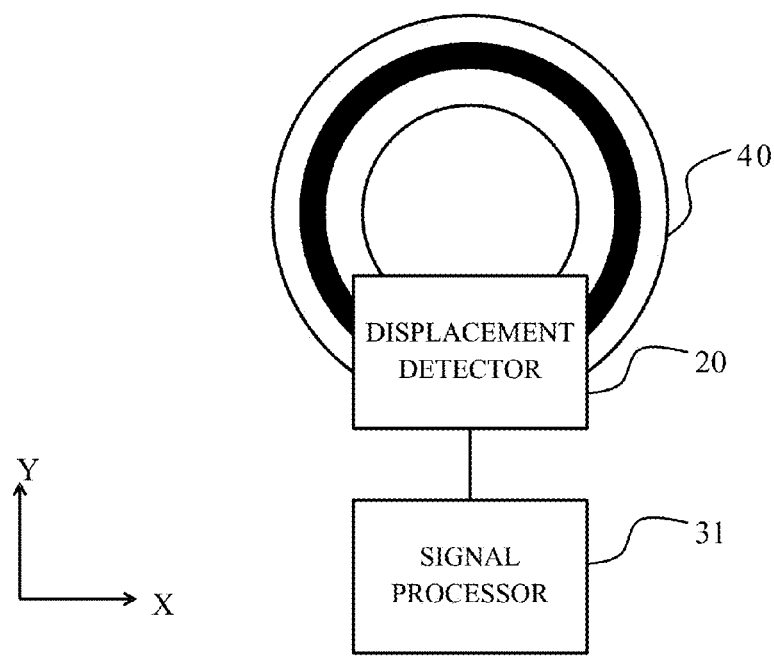
FIG. 19 is a block diagram of an encoder (a third example).

FIG. 19 is a block diagram of an encoder according to this example. The encoder according to this example includes a rotary scale 40. A diameter of the rotary scale 40 is 50 mm. On the rotary scale 40, a scale pattern is formed along a circumferential direction of the rotary scale 40, and a diameter of a region where the scale pattern is formed is 40.7 mm. That is, a periodic number of the A-phase and B-phase signals having a period (a pitch) of 64 μm is 2000. The rotary scale 40 also includes the origin pattern only in a specific azimuth.

The encoder of this example is different in a part of the processing of the origin detector 312 from that of the second example. Explanations of configurations and processing in the origin detector 312 similar to the second example are omitted.

The counter 3128 of this example switches a value set to the count value according to the direction of the origin detection as with the second example, but only when the comparator 3125 outputs the high-level signal and the direction determination signal is the high-level, set values are different. The count value of the sinusoidal signal obtained from the rotary scale is not negative, for example, if increasing from 1998 to 1999, the count value returns to 0. That is, the counter value overflows or underflows between 0 and 1999 as a boundary to count 2000 periods according to the periodic number of the rotary scale 40. Thus, when the comparator 3125 outputs the high-level signal and the direction determination signal is the high-level, the counter 3128 sets the counter value to −3 in the second example, but sets it to 1997 (=0−3+2000) in this example. The following processing is the same as that of the second example and thus explanations thereof are omitted.

According to the above configuration, the present invention can be applied to the rotary encoder including the absolute position calculator 313 that fails to include a changing function of the set value of the accumulation position according to a direction as the first example. In this example, as with the first and second examples, a system different from the detection method of the signal and the configuration of the processor may be used.

Fourth Example

Figure 20:
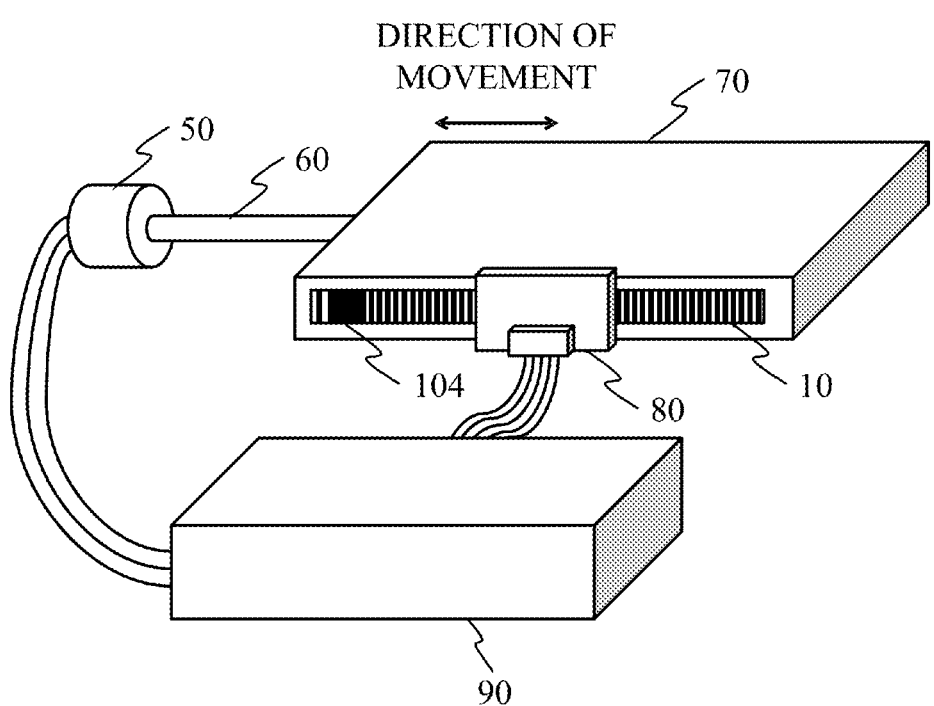
FIG. 20 is an appearance view of a linear stage including an encoder (a fourth example).

FIG. 20 is an appearance view of a linear stage including an encoder of the present invention. The linear stage includes a scale 10, a motor 50, a ball screw 60, a stage 70, an encoder 80 and a controller 90.

On the scale 10, the origin pattern 104 used as a reference of the absolute position is provided. The ball screw 60 linearly converts a rotation of the motor 50. The ball screw 60 moves the stage 70 along an arrow in the figure according to a rotational quantity of the motor 50. The scale 10 is adhered to a side surface of the scale 70 along a displacement direction, and the encoder 80 is attached to read the scale 10. The encoder 80, which is a reflective optical encoder, includes a displacement detector and a signal processor. The signal processor includes an origin detector having a counter. The encoder 80 converts two phase sinusoidal waves output from the displacement detector according to relative displacement with respect to the scale 10 into a positional signals, and outputs them to the controller 90. The controller 90 detects displacement of the stage 70 on the basis of the signals output from the encoder 80, and controls a position of the stage 70 by controlling the rotational quantity of the motor 50.

In the above configuration, even though the stage 70 reaches a limit position in the displacement direction, rotation of the motor 50 can be continued due to false operation of the controller 90. Limit sensors may be used to know the limit position in the displacement direction of the stage 70, but using the limit sensors in addition to the encoder 80 increases components such as peripheral circuit parts of the encoder 80 and the limit sensors. In this example, the controller 90 detects displacement from a reference position of the stage 70.

In this example, after power on, origin detection to search the origin pattern 104 is performed by moving the stage 70 to detect an origin, which is the reference position. When the displacement detector of the encoder 80 reaches above the origin pattern 104, an origin signal is output to the controller 90. When receiving the origin signal, the controller 90 recognizes that the stage 70 is positioned on the origin and resets the detection position at this point to 0. Subsequently, the controller 90 can perform the displacement detection using a region where the origin detection pattern exists as a reference position, and can accurately control the stage 70.

In this example, the encoder is used for the stage, but the encoder of the present invention can be used for various apparatuses other than the stage. For example, the encoder of the present invention can be used for focus position control of an image pickup apparatus and position control in a Z-axis direction of a die bonder, which is used for semiconductor packaging. That is, the present invention can be applied to an apparatus that uses an encoder for position control of an object and that permits operation for origin detection in the apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-230865, filed on Nov. 26, 2015, which is hereby incorporated by reference herein in its entirety.

What is claimed is:

1. An encoder comprising:
   a scale including a continuous part where physical characteristics periodically varies, and a discontinuous part that interrupts the continuous part;
   a detector that is relatively displaced with respect to the scale and that detects the physical characteristics of the scale; and
   a processor that detects an origin of the scale on the basis of a signal for displacement detection output from the detector,
   wherein the detector includes a sensitive part having sensitivity contributing to the signal for displacement detection on the basis of the physical characteristics and an insensitive part having no sensitivity contributing to the signal for displacement detection on the basis of the physical characteristics, and
   wherein the processor detects the origin on the basis of signal intensity of the signal for displacement detection when the sensitive part detects physical characteristics of the discontinuous part and on the basis of signal intensity of the signal for displacement detection when the insensitive part detects the physical characteristics of the discontinuous part.

2. The encoder according to claim 1, wherein a length of the sensitive and insensitive parts along a displacement direction of the scale is longer than a length corresponding to a wavelength of the continuous part in the detector.

3. The encoder according to claim 1,
   wherein the sensitive part includes a first, a second and a third sensitive parts, and the insensitive part includes a first and a second insensitive parts,
   wherein the first sensitive part, the first insensitive part, the second sensitive part, the second insensitive part and the third sensitive part are placed in order from a first end in a displacement direction of the scale, and
   wherein the processor detects the origin on the basis of signal intensity of a signal that the detector outputs when either of the sensitive parts arranged at both ends of the detector detects the physical characteristics of the discontinuous part and on the basis of signal intensity of a signal that the detector outputs when the insensitive part adjacent to the either of the sensitive parts detects the physical characteristics of the discontinuous part.

4. The encoder according to claim 1, wherein the processor calculates differences between a maximum signal value and a minimum value of signal values for a length corresponding one wavelength of the continuous part in the detector as signal intensity using the signal for displacement detection.

5. The encoder according to claim 1, wherein the processor calculates a square sum of at least two phase signals for displacement detection as signal intensity.

6. The encoder according to claim 1,
   wherein the processor includes a counter that counts number of signals output from the detector, and
   wherein the counter updates the number of signals to a predetermined value when the processor detects the origin.

7. The encoder according to claim 1, wherein the encoder is a linear encoder.

8. The encoder according to claim 1, wherein the encoder is a rotary encoder.

9. An apparatus comprising an encoder,
wherein the encoder includes:
   a scale including a continuous part where physical characteristics periodically varies and a discontinuous part that interrupts the continuous part;
   a detector that is relatively displaced with respect to the scale and detects the physical characteristics of the scale; and
   a processor that detects an origin of the scale on the basis of a signal for displacement detection output from the detector,
wherein the detector includes a sensitive part having sensitivity to the physical characteristics contributing to the signal for displacement detection and an insensitive part having no sensitivity to the physical characteristics contributing to the signal for displacement detection, and
wherein the processor detects the origin on the basis of signal intensity of the signal for displacement detection when the sensitive part detects physical characteristics of the discontinuous part and on the basis of signal intensity of the signal for displacement detection when the insensitive part detects the physical characteristics of the discontinuous part.

10. The apparatus according to claim 9, wherein a length of the sensitive and insensitive parts along a displacement direction of the scale is longer than a length corresponding to a wavelength of the continuous part in the detector.

11. The apparatus according to claim 9,
wherein the sensitive part includes a first, a second and a third sensitive parts, and the insensitive part includes a first and a second insensitive parts,
wherein the first sensitive part, the first insensitive part, the second sensitive part, the second insensitive part and the third sensitive part are placed in order from a first end in a displacement direction of the scale, and
wherein the processor detects the origin on the basis of signal intensity of a signal that the detector outputs when either of the sensitive parts arranged at both ends of the detector detects the physical characteristics of the discontinuous part and on the basis of signal intensity of a signal that the detector outputs when the insensitive part adjacent to the either of the sensitive parts detects the physical characteristics of the discontinuous part.

12. The apparatus according to claim 9, wherein the processor calculates differences between a maximum signal value and a minimum value of signal values for a length corresponding one wavelength of the continuous part in the detector as signal intensity using the signal for displacement detection.

13. The apparatus according to claim 9, wherein the processor calculates a square sum of at least two phase signals for displacement detection as signal intensity.

14. The apparatus according to claim 9,
wherein the processor includes a counter that counts number of signals output from the detector, and
wherein the counter updates the number of signals to a predetermined value when the processor detects the origin.

15. The apparatus according to claim 9, wherein the encoder is a linear encoder.

16. The apparatus according to claim 9, wherein the encoder is a rotary encoder.

* * * * *